US012556861B2

(12) United States Patent
Vilermo et al.

(10) Patent No.: US 12,556,861 B2
(45) Date of Patent: Feb. 17, 2026

(54) APPARATUS, METHODS AND COMPUTER PROGRAMS FOR CONTROLLING AUDIBILITY OF SOUND SOURCES

(71) Applicant: Nokia Technologies Oy, Espoo (FI)

(72) Inventors: Miikka Tapani Vilermo, Siuro (FI); Hannu Pulakka, Pirkkala (FI); Toni Makinen, Pirkkala (FI)

(73) Assignee: Nokia Technologies Oy, Espoo (FI)

(*) Notice: Subject to any disclaimer, the term of this patent is extended or adjusted under 35 U.S.C. 154(b) by 202 days.

(21) Appl. No.: 18/557,189

(22) PCT Filed: Apr. 1, 2022

(86) PCT No.: PCT/FI2022/050209
§ 371 (c)(1),
(2) Date: Oct. 25, 2023

(87) PCT Pub. No.: WO2022/229498
PCT Pub. Date: Nov. 3, 2022

(65) Prior Publication Data

US 2024/0388844 A1 Nov. 21, 2024

(30) Foreign Application Priority Data

Apr. 28, 2021 (GB) ...................................... 2106043

(51) Int. Cl.
*H04R 3/00* (2006.01)
*H04R 1/40* (2006.01)

(52) U.S. Cl.
CPC ............. *H04R 3/005* (2013.01); *H04R 1/406* (2013.01); *H04R 2430/01* (2013.01)

(58) Field of Classification Search
CPC ..... H04R 3/005; H04R 1/406; H04R 2430/01
USPC ........................................ 381/56, 58, 91, 92
See application file for complete search history.

(56) References Cited

U.S. PATENT DOCUMENTS

| | | | | |
|---|---|---|---|---|
| 9,197,974 | B1 | 11/2015 | Clark et al. | |
| 9,460,727 | B1 | 10/2016 | Jing et al. | |
| 2017/0195815 | A1* | 7/2017 | Christoph | H04S 7/303 |
| 2018/0176682 | A1* | 6/2018 | Goesnar | G10L 21/0364 |

(Continued)

FOREIGN PATENT DOCUMENTS

| | | | | |
|---|---|---|---|---|
| EP | 2690886 A1 | 1/2014 | | |
| WO | WO-2017062701 A1 * | 4/2017 | | A61N 1/36038 |
| WO | WO 2020/178475 A1 | 9/2020 | | |

*Primary Examiner* — William A Jerez Lora
(74) *Attorney, Agent, or Firm* — McCarter & English LLP

(57) ABSTRACT

Examples of the disclosure relate to apparatus, methods and computer programs for controlling amplification and/or attenuation of sound sources based on their position relative to an electronic device. The apparatus includes circuitry for obtaining audio signals from a plurality of microphones of an electronic device and determining loudness of sound sources based on the audio signals so as to determine the loudest sound source. The apparatus also includes circuitry for determining whether the loudest sound source is within a region of interest based on the audio signals and controlling audibility of the sound sources in accordance with whether the loudest sound source is within a region of interest. The audibility of the sound sources is controlled so that if the loudest sound source is not within the region of interest the loudest sound source is de-emphasized relative to other sound sources within the region of interest.

16 Claims, 8 Drawing Sheets

(56) References Cited

U.S. PATENT DOCUMENTS

| | | | | |
|---|---|---|---|---|
| 2018/0352329 | A1* | 12/2018 | Klingler | H04R 1/2888 |
| 2020/0005807 | A1* | 1/2020 | Allen | H04R 1/406 |
| 2020/0265860 | A1* | 8/2020 | Mouncer | G10L 21/0208 |
| 2020/0267472 | A1* | 8/2020 | McElveen | H04R 3/005 |
| 2023/0074395 | A1* | 3/2023 | Han | G06T 7/70 |
| 2023/0074589 | A1* | 3/2023 | Leppanen | H04N 23/695 |
| 2024/0177588 | A1* | 5/2024 | Du | H04N 23/57 |

* cited by examiner

APPARATUS, METHODS AND COMPUTER PROGRAMS FOR CONTROLLING AUDIBILITY OF SOUND SOURCES

CROSS REFERENCE TO RELATED APPLICATION

This patent application is a U.S. National Stage application of International Patent Application Number PCT/FI2022/050209 filed Apr. 1, 2022, which is hereby incorporated by reference in its entirety, and claims priority to GB 2106043.9 filed Apr. 28, 2021.

TECHNOLOGICAL FIELD

Examples of the disclosure relate to apparatus, methods and computer programs for controlling audibility of sound sources. Some relate to apparatus, methods and computer programs for controlling audibility of sound sources based on a position of the sound source.

BACKGROUND

Electronic devices comprising a plurality of microphones can capture audio from different directions. For example, if the electronic device comprises omnidirectional microphones these can capture sound from all around the electronic device. However, the user of the electronic device might be mainly interested in sound sources that are positioned in a particular position relative to the electronic device. For instance, if the electronic device comprises a camera then sound sources within the field of view of the camera might be more significant than sound sources outside of the field of view of the camera.

BRIEF SUMMARY

According to various, but not necessarily all, examples of the disclosure there is provided an apparatus comprising means for:

- obtaining two or more audio signals from a plurality of microphones of an electronic device;
- determining loudness of one or more sound sources based on the two or more audio signals so as to determine the loudest sound source;
- determining whether the loudest sound source is within a region of interest based on the two or more audio signals; and
- controlling audibility of the one or more sound sources in accordance with whether the loudest sound source is within a region of interest such that, if the loudest sound source is not within the region of interest the loudest sound source is de-emphasized relative to one or more other sound sources within the region of interest.

Controlling audibility of the one or more sound sources may comprise emphasizing the loudest source if it is determined that the loudest sound source is within the region of interest.

De-emphasizing the loudest source may comprise attenuating the loudest sound source relative to other sounds.

Controlling audibility of the one or more sound sources may comprise applying directional amplification in the region of interest when the loudest sound source is within the region of interest.

Controlling audibility of the one or more sound sources may comprise applying directional attenuation in a direction comprising the loudest sound source when the loudest sound source is not within the region of interest.

The directional amplification and/or the directional attenuation may be configured to reduce modification to the timbre of the loudest sound source.

The means may be for determining a dominant range of frequencies for the loudest sound source and selecting directional amplification and/or directional attenuation having a substantially flat response for the dominant range of frequencies.

The dominant range may be determined based on the type of sound source.

The means may be for using one or more beamformers to control the audibility of the one or more sound sources.

At least one beamformer may comprise a look direction that at least partially comprises the region of interest.

The at least one beamformer may comprise a null direction comprising a direction towards a sound source having a threshold loudness outside of the region of interest.

The means may be for using a combination of beamformers wherein at least one first beamformer comprises a look direction that at least partially comprises the region of interest and at least one second beamformer has a null direction comprising a direction towards a sound source having a threshold loudness outside of the region of interest.

The means may be for determining a direction of another sound source having a threshold loudness and reducing a weighting of the second beamformer if the another sound source having a threshold loudness is located towards a look direction of the second beamformer.

The electronic device may comprise two microphones and if a sound source can be identified as a target sound source a beamformer is applied and is a sound source cannot be identified as a target sound source a beamformer is not applied.

The means may be for applying a gain to maintain the overall volume of the audio signal.

The region of interest may be determined by an audio capture direction of the electronic device.

The region of interest may comprise a field of view of a camera of the electronic device.

According to various, but not necessarily all, examples of the disclosure there is provided an apparatus comprising at least one processor; and at least one memory including computer program code, the at least one memory and the computer program code configured to, with the at least one processor, cause the apparatus at least to perform:

- obtaining two or more audio signals from a plurality of microphones of an electronic device;
- determining loudness of one or more sound sources based on the two or more audio signals so as to determine the loudest sound source;
- determining whether the loudest sound source is within a region of interest based on the two or more audio signals; and
- controlling audibility of the one or more sound sources in accordance with whether the loudest sound source is within a region of interest such that, if the loudest sound source is not within the region of interest the loudest sound source is de-emphasized relative to one or more other sound sources within the region of interest.

According to various, but not necessarily all, examples of the disclosure there may be provided an electronic device comprising an apparatus as claimed in any preceding claim.

According to various, but not necessarily all, examples of the disclosure there may be provided a method comprising:

obtaining two or more audio signals from a plurality of microphones of an electronic device;

determining loudness of one or more sound sources based on the two or more audio signals so as to determine the loudest sound source;

determining whether the loudest sound source is within a region of interest based on the two or more audio signals; and controlling audibility of the one or more sound sources in accordance with whether the loudest sound source is within a region of interest such that, if the loudest sound source is not within the region of interest the loudest sound source is de-emphasized relative to one or more other sound sources within the region of interest.

According to various, but not necessarily all, examples of the disclosure there may be provided a computer program comprising computer program instructions that, when executed by processing circuitry, cause:

obtaining two or more audio signals from a plurality of microphones of an electronic device;

determining loudness of one or more sound sources based on the two or more audio signals so as to determine the loudest sound source;

determining whether the loudest sound source is within a region of interest based on the two or more audio signals; and controlling audibility of the one or more sound sources in accordance with whether the loudest sound source is within a region of interest such that, if the loudest sound source is not within the region of interest the loudest sound source is de-emphasized relative to one or more other sound sources within the region of interest.

BRIEF DESCRIPTION

Some examples will now be described with reference to the accompanying drawings in which.

Figure 10:
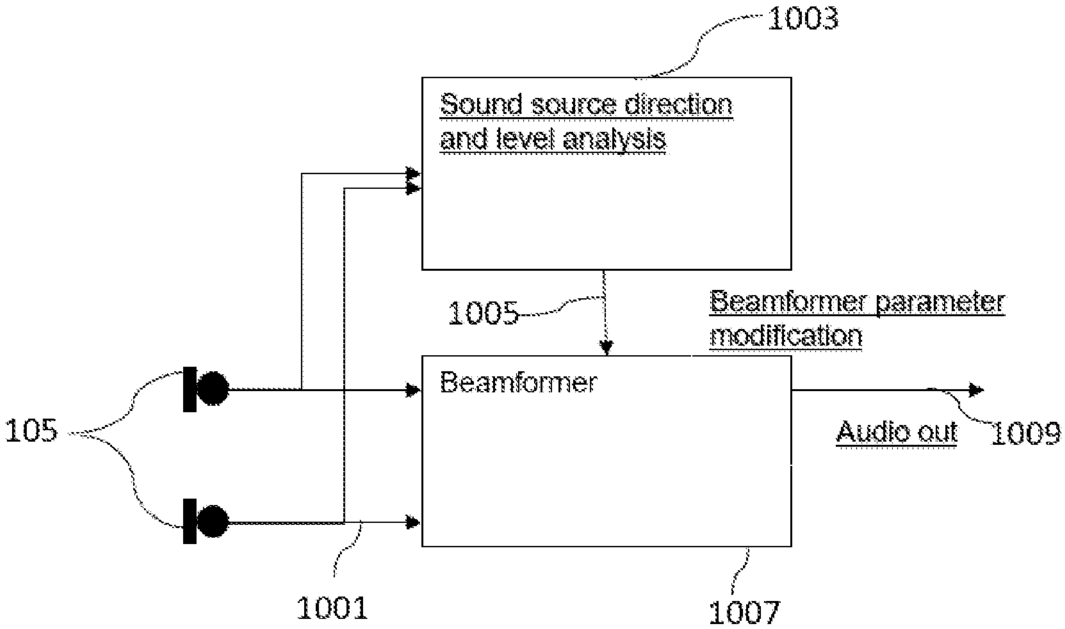
Figure 11:
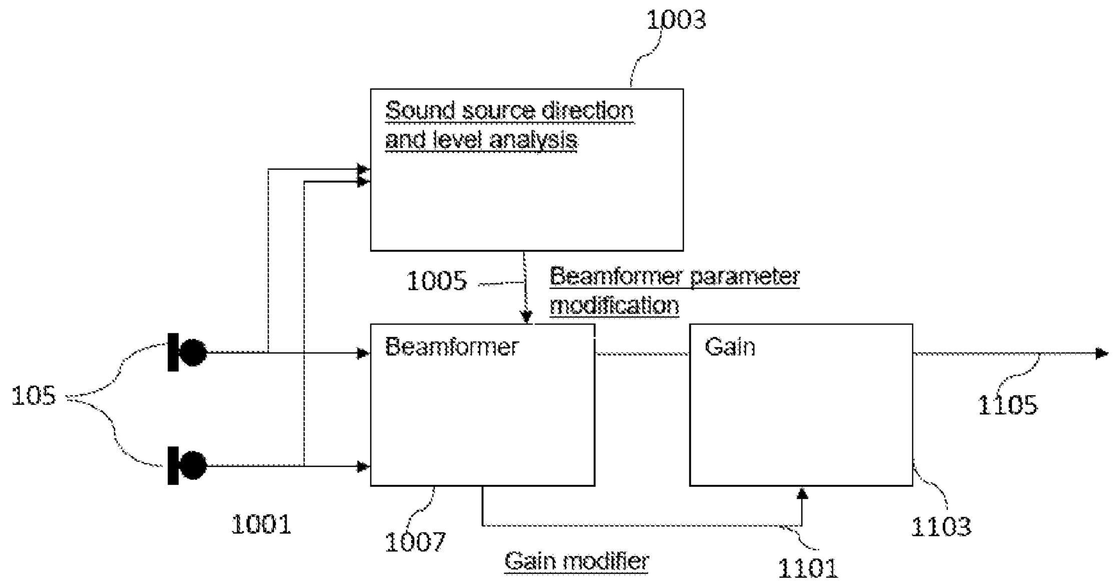
Figure 12:
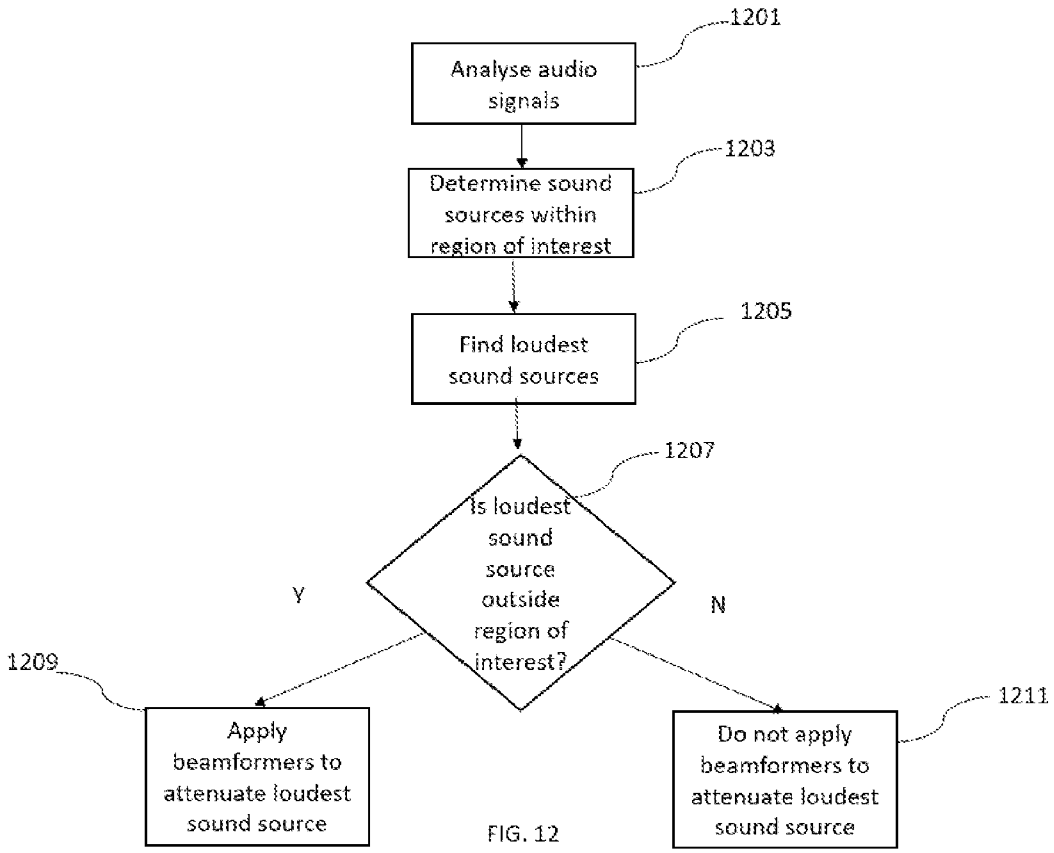
Figure 13:
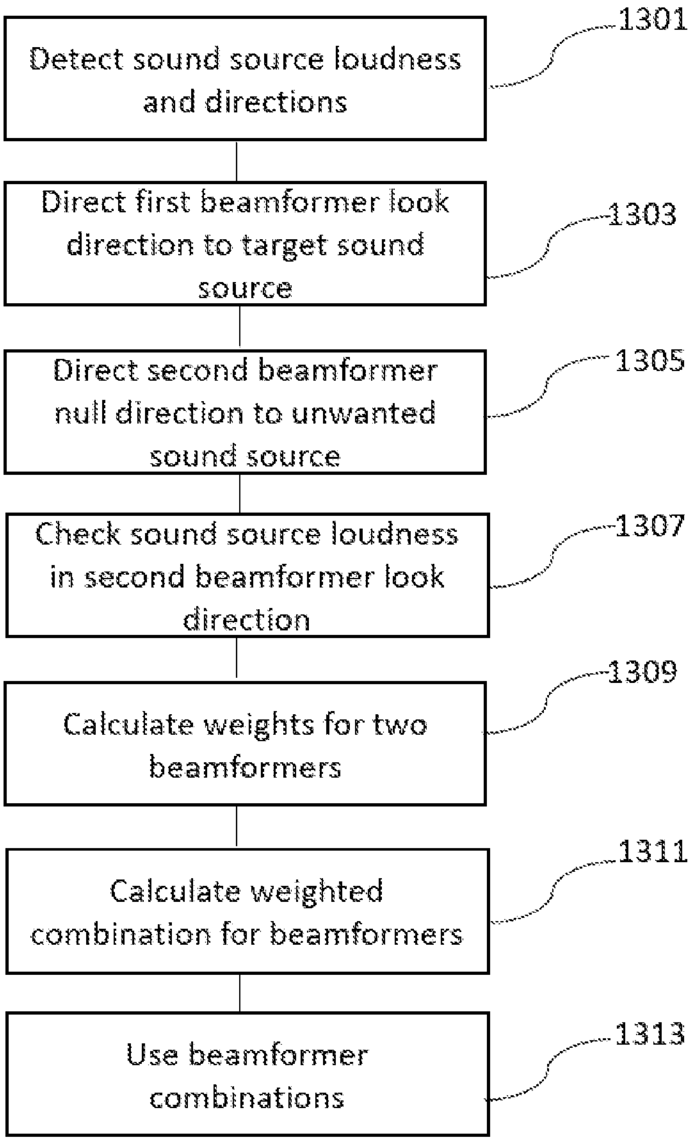
Figure 14A:
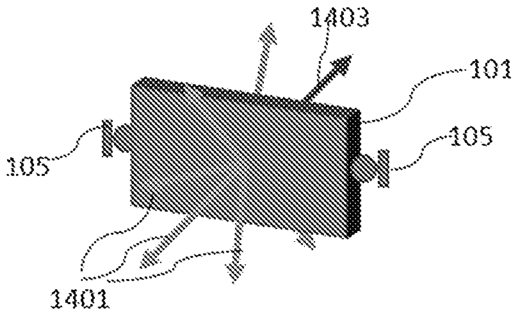
Figure 14B:
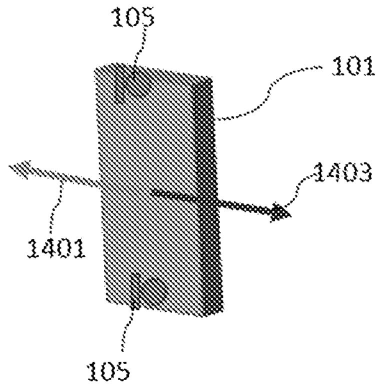

FIG. 10 schematically shows an apparatus;

FIG. 11 schematically shows an apparatus;

FIG. 12 shows a method;

FIG. 13 shows a method;

FIGS. 14A and 14B show an example device; and

Figure 15:
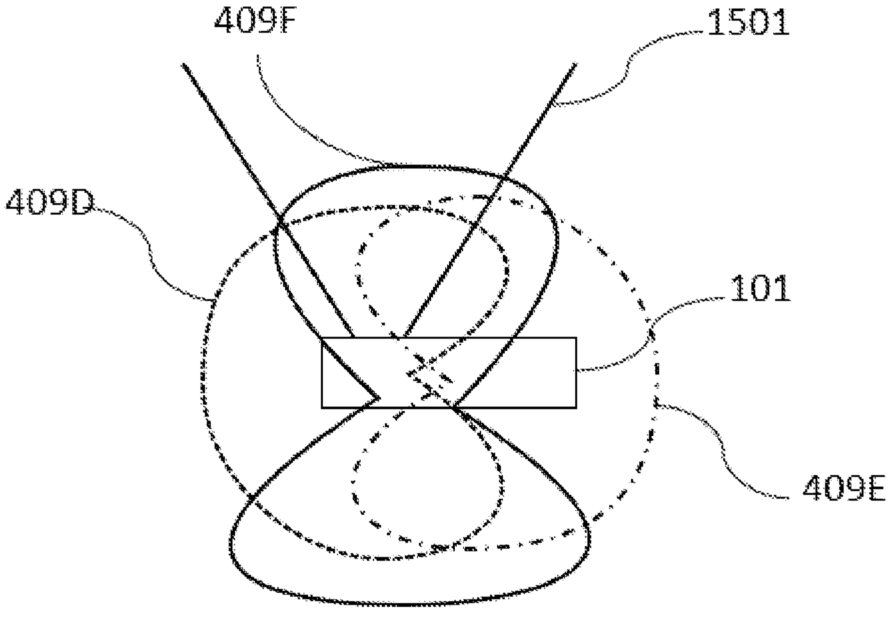

FIG. 15 shows an example device in use.

DETAILED DESCRIPTION

Examples of the disclosure relate to apparatus, methods and computer programs for controlling amplification and/or attenuation of sound sources based on their position relative to an electronic device. This can ensure that the sound sources that are most likely to be of interest to the user of the electronic device can be amplified relative to other sounds in the environment. In some examples of the disclosure the attenuation and/or amplification can be configured to retain the correct timbre of the sound sources and so provide for improved audio. Examples of the disclosure can also be used in electronic devices where the beamformers or other directional amplification and attenuation means are not accurate enough to provide narrow directions of focus.

Figure 1:
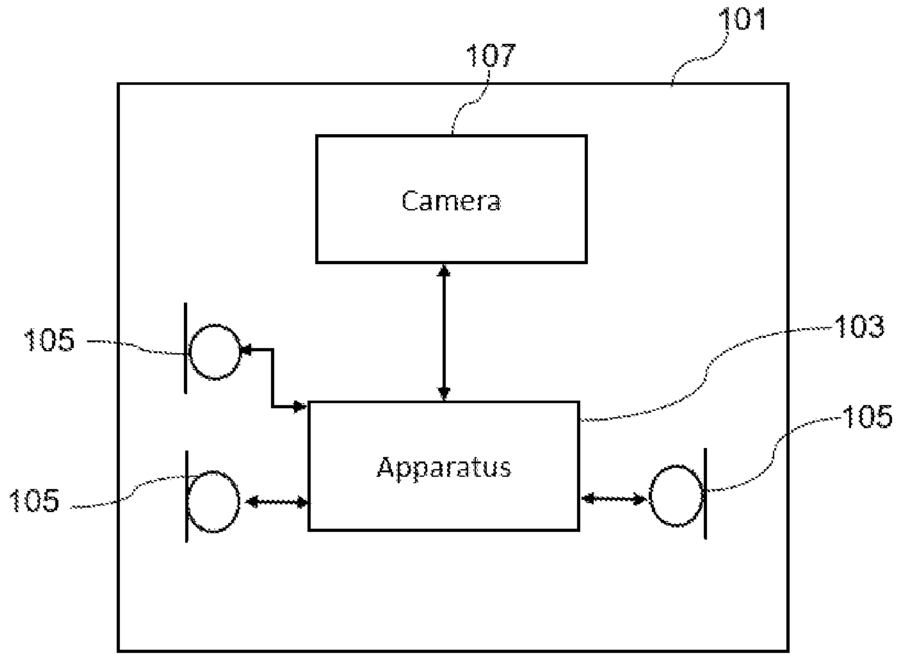
FIG. 1 shows an example electronic device.

FIG. 1 shows an example electronic device 101 that can be used to implement examples of the disclosure. The electronic device 101 could be a user device such as a mobile phone or other personal communication device. The electronic device 101 comprises an apparatus 103, a plurality of microphones 105 and a camera 107.

Figure 2:
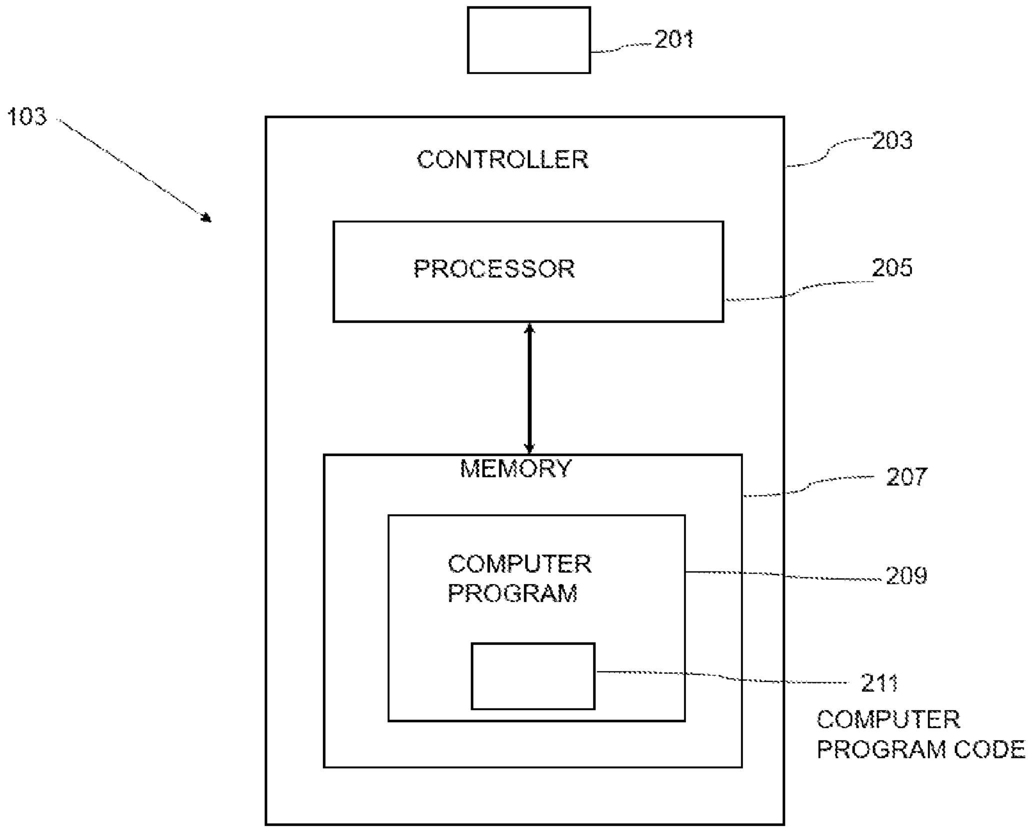
FIG. 2 shows an example apparatus.

The apparatus 103 that is provided within the electronic device 101 can comprise a controller 203 comprising a processor 205 and memory 207 that can be as shown in FIG. 2. The apparatus 103 can be configured to enable control of the electronic device 101. For example, the apparatus 103 can be configured to control the plurality of microphones 105 and processing of any audio signals that are captured by the plurality of microphones 105. The apparatus 103 can also be configured to control the images that are captured by the camera 107 and/or to control any other functions that could be implemented by the electronic device 101.

The electronic device 101 comprises two or more microphones 105. The microphones 105 can comprise any means that can be configured to capture sound and enable a microphone audio signal to be provided. The microphones 105 can comprise omnidirectional microphones. The microphone audio signals comprise an electrical signal that represents at least some of the sound field captured by the microphones 105.

In the example shown in FIG. 1 the electronic device 101 comprises two or more microphones 105. The microphones 105 can be provided at different positions within the electronic device 101 to enable spatial audio signals to be captured. In microphones 105 can be provided at different positions within the electronic device 101 so that the positions of one or more sound sources relative to the electronic device 101 can be determined based an audio signals captured by the microphones 105.

The microphones 103 are coupled to the apparatus 103 so that the microphone audio signals are provided to the apparatus 103 for processing. The processing performed by the apparatus 103 can comprise amplifying target sound sources and attenuating unwanted sound sources. The processing could comprise methods as shown in any of FIGS. 3, 12 and 13.

The camera 107 can comprise any means that can enable images to be captured. The images could comprise video images, still images or any other suitable type of images. The images that are captured by the camera 107 can accompany the microphone audio signals from the two or more microphones 105. The camera 107 can be controlled by the apparatus 103 to enable images to be captured.

In some examples of the disclosure the electronic device 101 can be used to capture audio signals to accompany images captured by the camera 107. In such examples the user may wish to capture sound sources that correspond to the field of view of the camera 107. That is the user might want to record the audio signals corresponding to sound sources that are within the field of view of camera 107 but might not be interested in sounds sources that are not within the field of view of the camera 107.

Only components of the electronic device 101 that are referred to in the following description are shown in FIG. 1. It is to be appreciated that the electronic device 101 could comprise additional components that are not shown in FIG. 1. For instance, the electronic device 101 could comprise a power source, one or more transceivers and/or any other suitable components.

FIG. 2 shows an example apparatus 103. The apparatus 103 illustrated in FIG. 2 can be a chip or a chip-set. The apparatus 103 can be provided within an electronic device 101 such as a mobile phone, personal electronics device or any other suitable type of electronic device 101. In some examples the apparatus 103 could be provided within a vehicle or other device that monitors the objects 109 within the surroundings. The apparatus 103 could be provided within electronic devices 101 as shown in FIG. 1.

In the example of FIG. 2 the apparatus 103 comprises a controller 203. In the example of FIG. 2 the implementation of the controller 203 can be as controller circuitry. In some examples the controller 203 can be implemented in hardware alone, have certain aspects in software including firmware alone or can be a combination of hardware and software (including firmware).

As illustrated in FIG. 2 the controller 203 can be implemented using instructions that enable hardware functionality, for example, by using executable instructions of a computer program 209 in a general-purpose or special-purpose processor 205 that can be stored on a computer readable storage medium (disk, memory etc.) to be executed by such a processor 205.

The processor 205 is configured to read from and write to the memory 207. The processor 205 can also comprise an output interface via which data and/or commands are output by the processor 205 and an input interface via which data and/or commands are input to the processor 205.

The memory 207 is configured to store a computer program 209 comprising computer program instructions (computer program code 211) that controls the operation of the apparatus 103 when loaded into the processor 205. The computer program instructions, of the computer program 209, provide the logic and routines that enable the apparatus 103 to perform the methods illustrated in FIGS. 3, 12 and 13. The processor 205 by reading the memory 207 is able to load and execute the computer program 209.

The apparatus 103 therefore comprises: at least one processor 205; and at least one memory 207 including computer program code 211, the at least one memory 207 and the computer program code 211 configured to, with the at least one processor 205, cause the apparatus 103 at least to perform:

- obtaining two or more audio signals from a plurality of microphones of an electronic device;
- determining loudness of one or more sound sources based on the two or more audio signals so as to determine the loudest sound source;
- determining whether the loudest sound source is within a region of interest based on the two or more audio signals; and
- controlling audibility of the one or more sound sources in accordance with whether the loudest sound source is within a region of interest such that, if the loudest sound source is not within the region of interest the loudest sound source is de-emphasized relative to one or more other sound sources within the region of interest.

As illustrated in FIG. 2 the computer program 209 can arrive at the apparatus 103 via any suitable delivery mechanism 201. The delivery mechanism 201 can be, for example, a machine readable medium, a computer-readable medium, a non-transitory computer-readable storage medium, a computer program product, a memory device, a record medium such as a Compact Disc Read-Only Memory (CD-ROM) or a Digital Versatile Disc (DVD) or a solid-state memory, an article of manufacture that comprises or tangibly embodies the computer program 209. The delivery mechanism can be a signal configured to reliably transfer the computer program 209. The apparatus 103 can propagate or transmit the computer program 209 as a computer data signal. In some examples the computer program 209 can be transmitted to the apparatus 103 using a wireless protocol such as Bluetooth, Bluetooth Low Energy, Bluetooth Smart, 6LoWPan ($IP_v6$ over low power personal area networks) ZigBee, ANT+, near field communication (NFC), Radio frequency identification, wireless local area network (wireless LAN) or any other suitable protocol.

The computer program 209 comprises computer program instructions for causing an apparatus 103 to perform at least the following:

- obtaining two or more audio signals from a plurality of microphones of an electronic device;
- determining loudness of one or more sound sources based on the two or more audio signals so as to determine the loudest sound source;
- determining whether the loudest sound source is within a region of interest based on the two or more audio signals; and
- controlling audibility of the one or more sound sources in accordance with whether the loudest sound source is within a region of interest such that, if the loudest sound source is not within the region of interest the loudest sound source is de-emphasized relative to one or more other sound sources within the region of interest.

The computer program instructions can be comprised in a computer program 209, a non-transitory computer readable medium, a computer program product, a machine readable medium. In some but not necessarily all examples, the computer program instructions can be distributed over more than one computer program 209.

Although the memory 207 is illustrated as a single component/circuitry it can be implemented as one or more separate components/circuitry some or all of which can be integrated/removable and/or can provide permanent/semi-permanent/dynamic/cached storage.

Although the processor 205 is illustrated as a single component/circuitry it can be implemented as one or more separate components/circuitry some or all of which can be integrated/removable. The processor 205 can be a single core or multi-core processor.

References to "computer-readable storage medium", "computer program product", "tangibly embodied computer program" etc. or a "controller", "computer", "processor" etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term "circuitry" can refer to one or more or all of the following:

(a) hardware-only circuitry implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions and (c) hardware circuit(s) and or processor(s), such as a microprocessor(s) or a portion of a microprocessor(s), that requires software (e.g. firmware) for operation, but the software might not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

Figure 3:
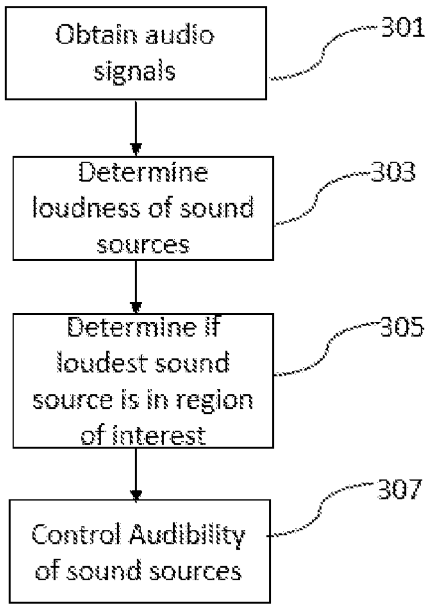
FIG. 3 shows an example method.

The blocks illustrated in FIGS. 3, 12 and 13 can represent steps in a method and/or sections of code in the computer program 209. The illustration of a particular order to the blocks does not necessarily imply that there is a required or preferred order for the blocks and the order and arrangement of the block can be varied. Furthermore, it can be possible for some blocks to be omitted.

FIG. 3 shows an example method according to examples of the disclosure. The method could be implemented using an apparatus 103 and/or electronic device 101 as described above or using any other suitable type of electronic device or apparatus.

At block 301 the method comprises obtaining a plurality of audio signals from two or more microphones 105 of an electronic device 101. The audio signals can comprise audio from one or more sound sources that are located in the environment around the electronic device 101.

Some of the sound sources could be target sources. The target sound sources are sound sources that the user is interested in. For example, if the user is using the camera 107 of the electronic device 101 to capture images the target sound sources could be sound sources that are within the field of view of the camera 107. If the user is using the electronic device 101 to make a telephone call the target sound sources could be the person or people making the telephone call. If the user is using the electronic device to record a person talking, such as during an interview, the target sound sources could be the person talking.

Some of the sound sources could be unwanted sound sources. The unwanted sound sources are sound sources that the user is not interested in. For example, if the user is using the camera 107 of the electronic device 101 to capture images the unwanted sound sources could be sound sources that are outside of the field of view of the camera 107. If the user is using the electronic device 101 to make a telephone call the unwanted sound sources could be sound sources other than the person or people making the telephone call.

At block 303 the method comprises determining loudness of one or more sound sources based on the plurality of audio signals. The loudness of the one or more sound sources can be determined using any suitable parameter. For example, the loudness can be determined by analysing the energy levels in different frequency bands of the audio signals captured by the plurality of microphones 105. In some examples beamforming could be used to obtain focussed audio signals and the focussed audio signals could be used to determine the loudness of the sound sources.

The loudest sound source can be determined. In some examples one or more sound sources having a loudness above a threshold loudness level can be determined. The threshold loudness can be any suitable threshold. The threshold loudness can be used to differentiate sound sources from ambient noise. The threshold loudness could be that the sound source is the loudest sound source within the environment. The threshold loudness could be defined relative to the loudest source in the environment, for example the threshold could be sound sources that are at least half as loud as the loudest sound source. In some examples the threshold loudness could be defined relative to ambient noise, for example the threshold could be a given amount above the ambient noise.

At block 305 the method comprises determining whether the loudest sound source is within a region of interest based on the two or more audio signals.

The region of interest can be any suitable area or volume around the electronic device 101. The factors that determine the region of interest can be depended upon the use of the electronic device 101. The region of interest can be determined by an audio capture direction of the electronic device 101. For example, if the camera 107 of the electronic device 101 is being used to capture images, then the region of interest can comprise the field of view of the camera 107. If the camera 107 is being used in a zoom mode, then the region of interest could comprise only a section of the field of view of the camera 107 where the section is determined by the zooming. In examples where the electronic device 101 is being used to make a telephone call the region of interest could be determined by the location of the people or person making the telephone call. For instance, if the user is holding the electronic device 101 close to their face to make an audio call, then the region of interest could be determined to be an area around the microphone 105 that is closest to the user's mouth. If the user is using the electronic device 101 to record speech during an interview, or for another similar purpose, then the region of interest could be determined to be an area around a microphones 105 facing towards an audio capture direction.

The audio signals detected by the plurality of microphones 105 can be used to determine a position of the sound sources. The audio signals detected by the plurality of microphones 105 can be used to determine a direction of the sound sources relative to the electronic device 101. Any suitable means can be used to determine the position of the sound sources, for example time difference on arrival methods, beamforming-based methods or any other suitable processes or combinations of processes.

Once the position or direction of the sound sources has been determined this can be compared to the region of interest to determine whether or not the sound source is within the region of interest. This indicates whether the sound source is a target sound source or an unwanted sound source. In some examples the sound sources that are within the region of interest can be determined to be the target sound sources and the sound sources that are not within the region of interest can be determined to be the unwanted sound sources.

Once it has been determined whether or not the loudest sound source is within the region of interest, at block 307, the audibility of the sound sources is controlled in accordance with whether or not the loudest sound source is within the region of interest. Controlling the audibility of the sound sources can comprise de-emphasizing the loudest sound source relative to other sounds or sound sources if it is determined that the loudest sound source is not within the region of interest. This enables de-emphasizing unwanted sound sources.

The de-emphasizing of the loudest sound source can comprise attenuating the loudest sound source, amplifying other sounds or sound sources more than the loudest source, having a higher level of attenuation for the loudest sound source compared to other sound sources.

When the loudest sound source is not within the region of interest then the loudest sound source is not amplified relative to other sounds.

In some examples the not amplifying of the sound source could comprise attenuating the sound source relative to other sounds. The attenuation relative to other sounds could comprise the attenuation of the unwanted sound source, the amplification of other sounds or a combination of both of these.

In some examples the not amplifying of the sound source could comprise not applying any amplification or additional amplification to the audio signals. For instance, if it is determined that a sound source is either in front of or behind an electronic device 101 comprising only two microphones 101 then it can be determined not to apply any beamformers or other directional amplification means.

When the loudest sound source is within the region of interest then controlling the audibility of the loudest source can comprise amplifying the loudest sound source relative to other sounds or sound sources. The other sounds could be one or more other sound sources and/or ambient noise. The amplification relative to other sounds could comprise the amplification of the target sound source, the attenuation of other sounds or a combination of both of these.

The controlling of the audibility of the sound sources can be achieved by using directional means. For example, directional amplification can be applied in the region of interest when the loudest sound source is within the region of interest. Similarly directional attenuation can be applied in a direction comprising the loudest sound source when the loudest sound source is not within the region of interest.

The directional attenuation and/or amplification can comprise one or more beamformers or any other suitable means. In some examples the directional amplification could comprise one or more beamformers with a look direction in the region of interest and the directional attenuation could comprise one or more beamformers a null direction in the direction of the unwanted sound source. Combinations of different beamformers can be used in some examples. Different weightings can be applied to the different beamformers within the combinations.

FIGS. 4 to 9 show example electronic devices 101 in use. In these examples the directional attenuation and/or amplification comprises one or more beamformers. Other types of directional attenuation and/or amplification, such as spectral filtering, could be used in other examples of the disclosure.

In the examples of FIGS. 4 to 9 the electronic device 101 can comprise a plurality of different microphones 105 provided in a spatial array within the electronic device 101. The microphones 105 are not shown for clarity. It is to be appreciated that they can be provided in any suitable arrangement within the electronic device 101. In these examples more than two microphones 105 can be provided within the array so as to enable a plurality of different beamformer patterns to be provided. Other arrangements of the microphones 105 and shapes of the beamformer patterns could be used in other examples of the disclosure.

Figure 4:
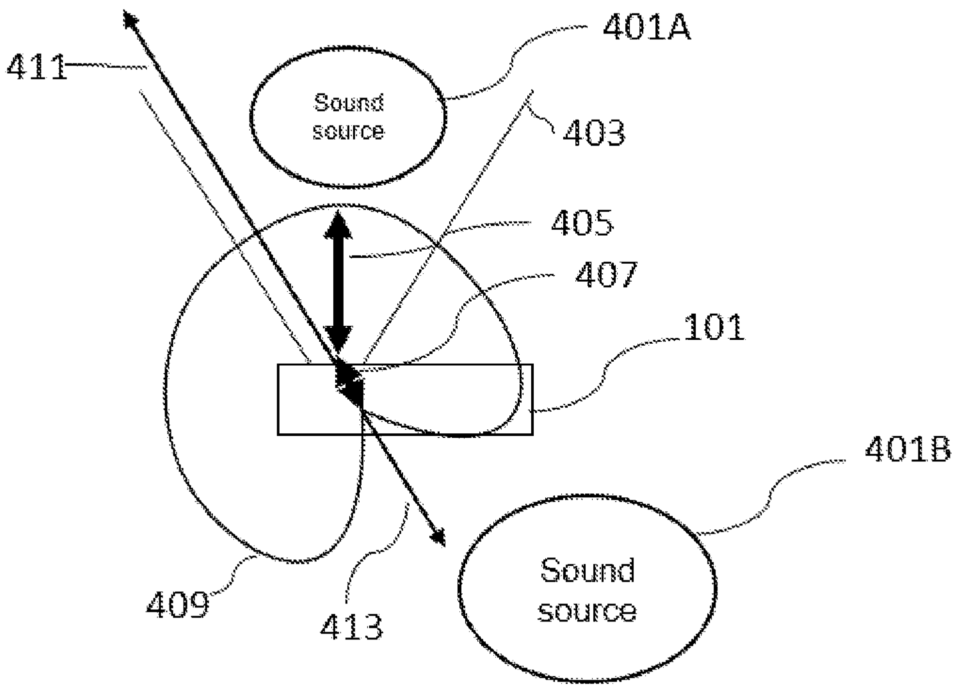
FIG. 4 shows an example device in use.

FIG. 4 shows an example electronic device 101 and the region of interest 403 for the electronic device 101. The region of interest could be the field of view of a camera 107, part of the field of view of the camera 107, a region around a microphone being used for audio calls or any other suitable region.

In FIG. 4 two sound sources 401A, 401B are in the environment around the electronic device 101. The first sound source 401A is positioned within the region of interest 403. The first sound source 401A can therefore be a target sound source 401A.

The second sound source 401B is positioned outside of the region of interest 403. The second sound source 401B can therefore be an unwanted sound source 401B. In this example the second sound source 401B is positioned toward the rear of the electronic device 101. The second sound source 401B is provided on the opposite side of the electronic device 101 to the first sound source 401A and the region of interest 403.

In the example of FIG. 4 both of the sound sources 401A, 401B can have a loudness that is above a threshold loudness. In this example the second sound source 401B is louder than the first sound source 401A. This is indicated by the second sound source 401B being larger than the first sound source 401A in FIG. 4. Therefore, in this example the target sound source 401A is not the loudest sound source. In this example an unwanted sound source 401B is the loudest sound source and the loudest sound source is not within the region of interest 403. Therefore, in this example it is useful to provide amplification in the direction of the first sound source 401A as indicated by the arrow 405. It is also useful to provide attenuation in the direction of the second sound source 401B as indicated by the arrow 407.

FIG. 4 shows an example beamformer pattern 409 that can be used to control the audibility of the sound sources 401A, 401B by providing amplification and attenuation in the desired directions. The beamformer pattern 409 has a look direction indicated by the arrow 411. This is within the region of interest 403 but is not directly towards the first sound source 401A. This will therefore provide some amplification of the first sound source 401A.

The beamformer pattern 409 has a null direction indicated by the arrow 413. The null direction is directed towards the second sound source 401B. This will therefore provide attenuation of the second sound source 401B.

Therefore, the beamformer pattern 409 can be selected to provide amplification of a target sound source 401A and attenuation of the unwanted sound source 401B. the look direction 411 of the beamformer pattern 409 does not need to be aligned directly with the target sound source 401A so as to enable the target sound source 401A to be amplified relative to the other sounds.

In the example of FIG. 4 the directional amplification and attenuation can be selected can be selected so as to reduce modification to the timbre of the sound sources 401A, 401B. In FIG. 4 the beamformer pattern 409 can be selected so as to reduce modification to the timbre of the sound sources 401A, 401B.

In some examples the reduction in the modification of the timbre can be achieved by determining a dominant range of frequencies for the sound sources 401A, 401B. The dominant range of frequencies can be determined for each of the different sound sources 401A, 401B. The directional amplification and attenuation can then be selected to have a substantially flat response for the dominant range of frequencies.

The dominant range of frequencies are the frequencies that are important in preserving the essence of the sound source 401A, 401B. The dominant range of frequencies will depend upon the type of sound provided by the sound source 401A, 401B. For speech, the dominant frequencies could be substantially within the range 100 Hz-4 kHz.

Any suitable means can be used to determine a dominant range of frequencies for the sound sources 401A, 401B. In some examples the apparatus 103 of the electronic device 101 can be configured to analyse frequency characteristics of the sound sources 401A, 401B by converting beamformed or separated estimates of the audio signals from the sound sources 401A, 401B into frequency domain signals. Any suitable time-to-frequency conversion method can be used. The frequency characteristics of the sound sources 401A, 401B are estimated in the frequency domain. This can enable the dominant frequencies to be identified.

An example method to identify dominant frequencies is to identify frequencies close to the frequency where the loudness of sound source 401A, 401B is at a maximum or substantially at a maximum. An example method to identify dominant frequencies is to identify frequencies where the sound source 401A, 401B is less than a threshold quieter than the loudest frequency component, or substantially loudest frequency component, of the sound source 401A, 401B.

In some examples the apparatus 103 can be configured to identify a dominant frequency range based on the type of sound source 401A, 401B. For example, it can be determined if the sound source 401A, 401B is speech, music, noise or any other type of sound source 401. Any suitable means can be used to recognise the different types of sound sources 401. The dominant frequencies can then be determined based on the type of sound source 401A, 401B that has been recognised. For instance, a music sound source 401 sound have a dominant frequency range of 150-12000 Hz and a speech sound source 401 could have a dominant frequency range of 100-4000 Hz.

Once the range of dominant frequencies has been determined the beamformer pattern 409 can be selected so that the range of dominant frequencies fall inside the range where the beamformer frequency response is flat or substantially flat. The beamformer pattern 409 can be selected so that the flat frequency response in the look direction 411 is wider than the range that fits the dominant frequency components of first sound source 401A. The beamformer pattern 409 can also be selected so that the flat frequency response in the null direction 413 is in a second frequency range that fits the dominant frequency components of the second sound source 401B. This avoids modification of the timbre of the sound sources 401A, 401B and provides a high-quality audio signal with little distortion.

In some examples the flat, or substantially flat, frequency response can be obtained by adding the beamformed signal to an omnidirectional signal that has a flat frequency response in all directions. This can provide a flatter frequency response but as a trade-off would reduce the relative amounts of amplification and attenuation.

Figure 5:
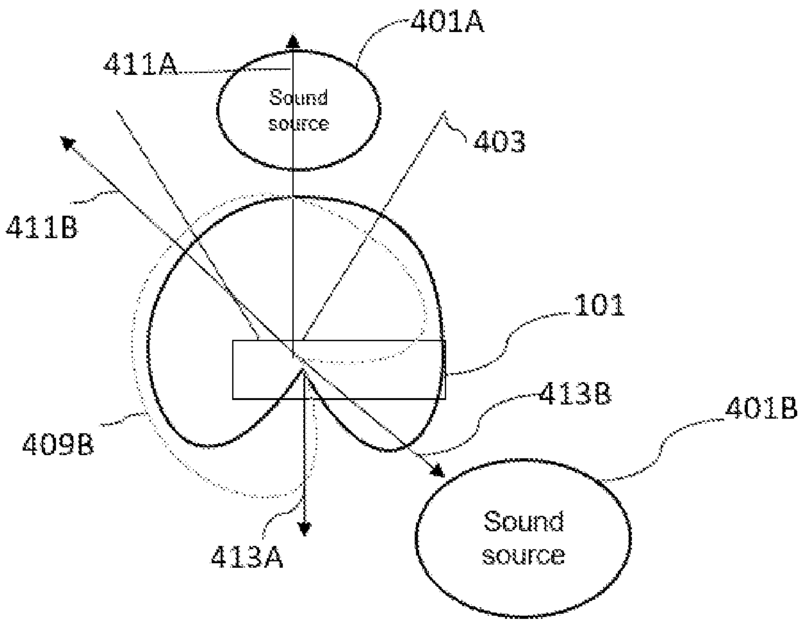
FIG. 5 shows an example device in use.

FIG. 5 shows another example in which a first sound source 401A is located within a region of interest 403 and second sound source 401B, which is the loudest sound source, is located outside of the region of interest 403. The first and second sound sources 401A, 401B are arranged as shown in FIG. 4. Other arrangements of the sound sources 401A, 401B could be used in other examples of the disclosure.

In the example of FIG. 5 a plurality of beamformer patterns 409A, 409B are combined to provide the directional amplification and attenuation and control the audibility of the respective sound sources 401A, 401B.

In this example two beamformer patterns 409A, 409B. Other numbers of beamformer patterns 409A, 409B can be used in other examples of the disclosure. Each of the beamformer patterns 409A, 409B has a look direction 411A, 411B and a null direction 413A, 413B. The look direction 411A, 411B provides maximum, or substantially maximum, amplification of a sound source 401A, 401B. The null direction 413A, 413B provides maximum, or substantially maximum, attenuation of a sound source 401A, 401B.

In this example the first beamformer pattern 409A has a look direction 411A that is directed towards the first sound source 401A. The look direction 411A of the first beamformer pattern 409A can be directed directly towards, or substantially directly towards the first sound source 401A. This first beamformer pattern 409A provides some amplification in the direction of the second sound source 401B and so on its own it would not provide improved audio.

The second beamformer pattern 409B has a null direction 413B that is directed towards the second sound source 401B. The null direction 413B of the second beamformer pattern 409B can be directed directly towards, or substantially directly towards the second sound source 401B.

The combined beamformer patterns 409A, 409B therefore provide for attenuation of unwanted sound sources 401B and amplification of target sound sources 401A and so provide for improved audio signals. The combination of different beamformer patterns 409 can be simpler than designing a specific beamformer pattern 409.

The combination of the different beamformer patterns 409A, 409B can comprise summing the respective signals with appropriate weights applied to each of the different beamformer patterns 409A, 409B. The weights can be applied dependent upon whether more emphasis is to be given to amplification or attenuation of the sound sources 401A, 401B.

In the example of FIG. 5 if the amplification of the target sound source 401A is to be emphasized then the first beamformer pattern 409A is given the larger weighting. The larger weighting for the first beamformer pattern 409A could be used if the region of interest 403 comprises a zoomed in section of the field of view of a camera 107. If the attenuation of the unwanted sound source 401B is to be emphasized then the second beamformer pattern 409B is given the larger weighting. The larger weighting for the second beamformer pattern 401B could be used if the unwanted sound source 401B is significantly louder than the target sound source 401A. Other factors for controlling the weighting could be used in other examples of the disclosure.

Figure 6:
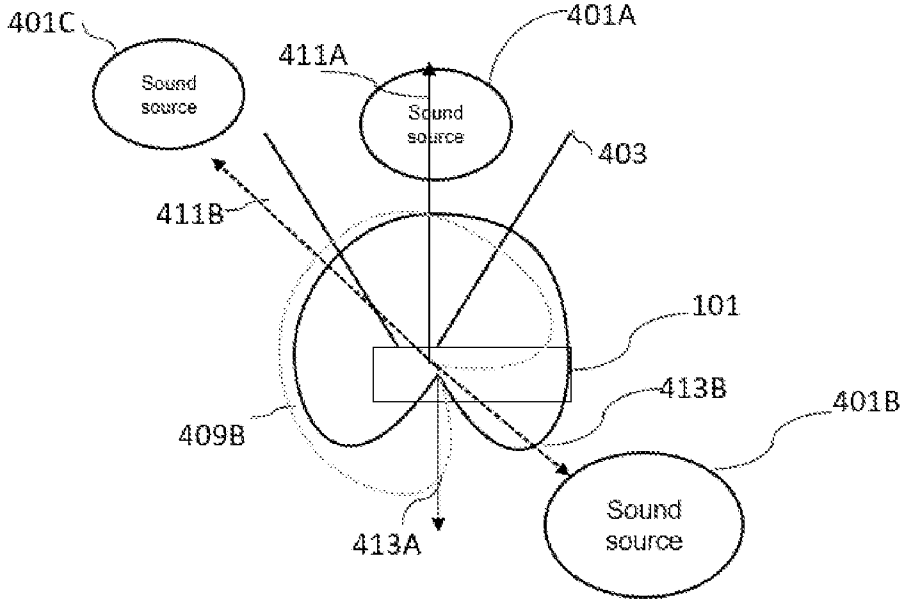
FIG. 6 shows an example device in use.

FIG. 6 shows another example where a combination of beamformer patterns 409 can be used. In this example a first sound source 401A is located within a region of interest 403 and second sound source 401B is located outside of the region of interest 403. The first and second sound sources 401A, 401B are arranged as shown in FIGS. 4 and 5. In the example of FIG. 6 a third sound source 401C is also provided. The third sound source 401C is another unwanted sound source 401C that is also located outside of the region of interest 403. The third sound source 401C is located towards the front of the electronic device 101. The third sound source 401C is located on the same side of the electronic device 101 as the target sound source 401A. In the example of FIG. 6 the second sound source 401B is the loudest sound source.

In the example of FIG. 6 a plurality of beamformer patterns 409A, 409B are combined to provide the directional amplification and attenuation and control the audibility of the respective sound sources 401A, 401B. The beamformer patterns 409A, 409B are as shown in FIG. 5. It is to be appreciated that other arrangements of beamformer patterns 409A, 409B could be used in other examples of the disclosure.

Each of the beamformer patterns 409A, 409B has a look direction 411A, 411B and a null direction 413A, 413B. As in the example of FIG. 5 the first beamformer pattern 409A has a look direction 411A that is directed towards the first sound source 401A and the second beamformer pattern 409B has a null direction 413B that is directed towards the second sound source 401B. However, the look direction 411B of the second beamformer pattern 409B is directed towards the third sound source 401C. This means that, although the second beamformer pattern 409B would cause the attenuation of the second sound source 401B it would also cause the amplification of the third sound source 401C. This would lead to the amplification of an unwanted sound source 401C which would reduce the audio quality.

Therefore, in the example of FIG. 6 the apparatus 103 can determine whether or not any of the unwanted sound sources 401B, 401C are in the look direction 411, or substantially in the look direction 411 of any of the beamformer patterns 409. If it is determined that one or more of the beamformer patterns 409 has an unwanted sound source in the look direction 411, or substantially in the look direction 411, then the combination of the beamformer patterns 409 can be controlled so that the beamformer patterns 409 with unwanted sounds source in the look direction 411, or substantially in the look direction 411 are not used.

In some examples the weightings of the different beamformer patterns 409 can be adjusted when it is determined that a beamformer pattern 409 has unwanted sounds source in the look direction 411, or substantially in the look direction 411. The weightings of these beamformer patterns 409 could be reduced and/or set to zero.

Figure 7:
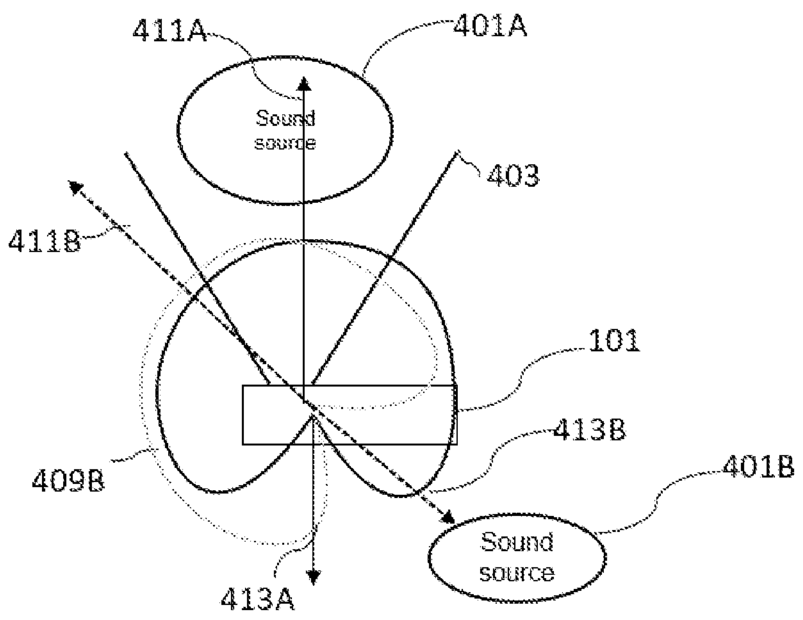
FIG. 7 shows an example device in use.

FIG. 7 shows an example where the different sounds sources 401A, 401B have different levels of loudness. In the example of FIG. 7 the first sound source 401A is louder than the second sound source 401B so that the loudest sound source is within the region of interest 403. This is shown in FIG. 7 by the first sound source 401A being larger than the second sound source 401B.

The apparatus 103 can use any suitable methods to determine the loudness of the respective sound sources 401A, 401B. The apparatus 103 can determine the loudness of the sound sources 401A, 401B based on the audio signals detected by the microphones 105.

In FIG. 7 the apparatus 103 can apply a combination of two beamformer patterns 409A, 409B to control the audibility of the sound sources. The beamformer patterns 409A, 409B are as shown in FIGS. 5 and 6. Other combinations of beamformer patterns 409 could be used in other examples of the disclosure.

In the example of FIG. 7 the different beamformer patterns 409A, 409B can have different weights applied to them based on the relative loudness levels of the different sound sources 401A, 401B.

In the example of FIG. 7 the first beamformer pattern 409A is given a bigger weighting than the second beamformer pattern 409B. In this case the first beamformer pattern 409A has the bigger weighting because the look direction 411A of the first beamformer pattern 409A is directed towards the target sound source 401A. As the target sound source 401A is the loudest sound source 401A this means that it can be detected well and a sound source 401A that can be detected well can also be amplified well. This means that the first beamformer pattern 409A will work well to amplify the first sound source 401A.

Conversely the attenuation of the second source 401B is not as important in this example because the second source 401B is already not as loud as the target sound source 401A.

This means that using the smaller weighting for the second beam former pattern 409B will still enable a high-quality audio signal to be obtained.

Figure 8:
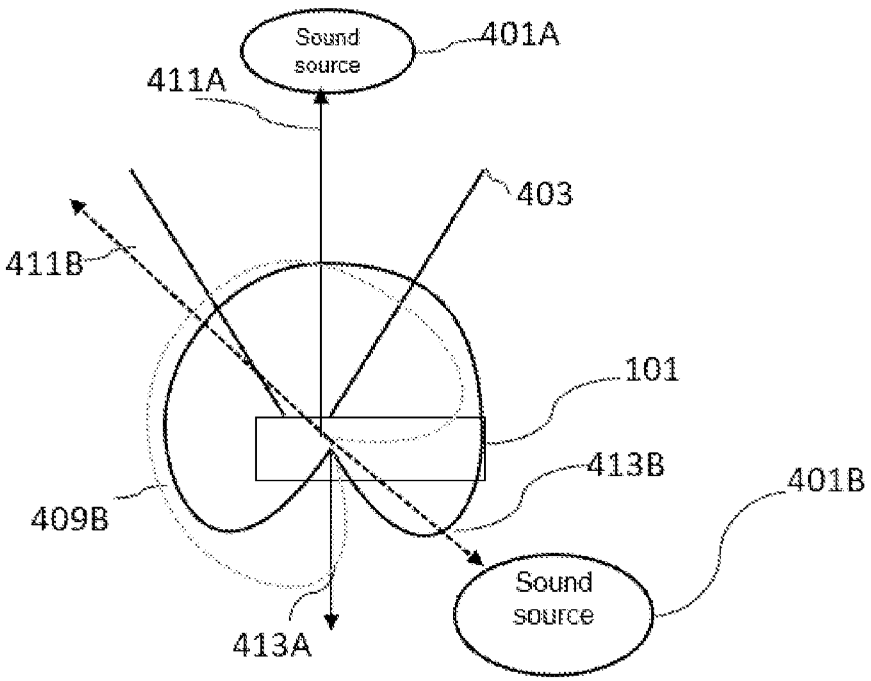
FIG. 8 shows an example device in use.

FIG. 8 shows another example where the different sounds sources 401A, 401B have different levels of loudness. In the example of FIG. 8 the second sound source 401B is louder than the first sound source 401A so that the loudest sound source is not within the region of interest. This is shown in FIG. 8 by the first sound source 401A being smaller than the second sound source 401B.

In FIG. 8 the apparatus 103 can apply a combination of two beamformer patterns 409A, 409B to control the audibility of the sound sources. The beamformer patterns 409A, 409B are as shown in FIGS. 5 to 7. In the example of FIG. 8 the different beamformer patterns 409A, 409B can have different weights applied to them based on the relative loudness levels of the different sound sources 401A, 401B.

In the example of FIG. 8 the second beamformer pattern 409B is given a bigger weighting than the first beamformer pattern 409A. In this case the first beamformer pattern 409A would cause some amplification of the second sound source 401B. this means that the first beam former pattern 409A would cause amplification of both the target sound source 401A and the unwanted sound source 401B. As the unwanted sound source 401B is louder than the target sound source 401A this would not provide a very good quality audio signal.

However, the second beamformer pattern 409B causes attenuation of the unwanted sound source 401B while still providing some amplification of the target sound source 401A. Therefore, this second beamformer pattern 409B can be given a higher weighting to improve the audio quality.

Figure 9:
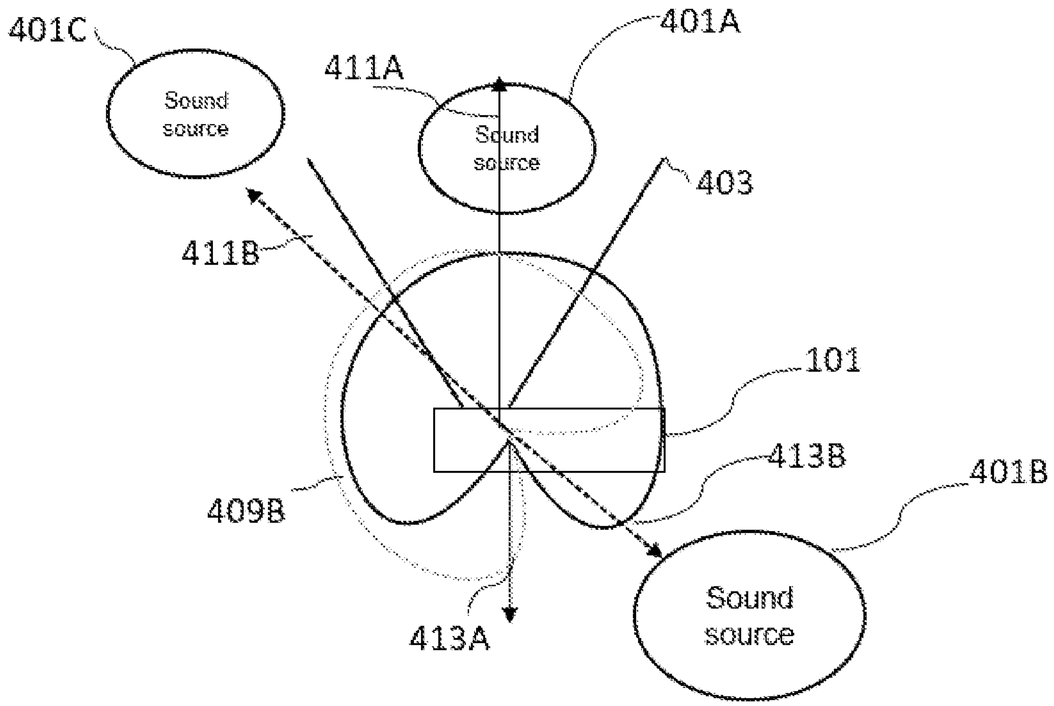
FIG. 9 shows an example device in use.

FIG. 9 shows another example where the different sound sources 401A, 401B have different levels of loudness. In the example of FIG. 9 the second sound source 401B is louder than the first sound source 401A so that the loudest sound source is not within the region of interest 403. This is shown in FIG. 9 by the first sound source 401A being smaller than the second sound source 401B. In FIG. 9 there is also a third sound source 401C. The third sound source 401C is also located outside of the region of interest 403 therefore the third sound source 401C is also an unwanted sound source 401C. The third sound source 401C is also louder than the first sound source 401A.

In FIG. 9 the apparatus 103 can apply a combination of two beamformer patterns 409A, 409B. The beamformer patterns 409A, 409B are as shown in FIGS. 5 to 8. The additional sound source 401C changes the weightings that are applied to the respective beamformer patterns 409A, 409B compared to the example of FIG. 8.

In the example of FIG. 9 the third sound source 401C is provided towards the look direction 411B of the second beamformer pattern 409B. This means that, although the second beamformer pattern 409B would attenuate the second source 401B well it would also cause the amplification of the third sound source 401C. In FIG. 9 the third sound source 401C is louder than the target sound source 401A and so this amplification of the unwanted sound source 401C would lead to a poor-quality audio signal for the target sound source 401A.

FIG. 10 schematically shows modules of an apparatus 103 that could be used to implement examples of the disclosure.

The two or more microphones 105 are configured to obtain a plurality of audio signals 1001 and provide these to the modules of the apparatus 103.

The plurality of audio signals 1001 are provided to a sound source direction and level analysis module 1003. The sound source direction and level analysis module 1003 is configured to determine the direction of one or more sound sources 401 relative to the electronic device 101 and/or the microphones 105.

The directions of the sound sources 401 can be determined based on the plurality of audio signals 1001. In some examples the directions of the sound sources 401 can be determined using methods such as time difference on arrival methods, beamforming-based methods, or any other suitable methods.

The sound source direction and level analysis module 1003 can also be configured to determine the loudness of the one or more sound sources 401. The sound source direction and level analysis module 1003 can use the audio signals 1001 to determine the loudness of the one or more sound sources 401. The sound source direction and level analysis module 1003 can determine which sound sources 401 are the loudest, and/or which sound sources 401 are above a threshold level of loudness.

The sound source direction and level analysis module 1003 can use any suitable method to determine the loudness of the different sound sources 401. For example, the loudness can be determined by analysing separated or beamformed signal energy, level or by any other suitable methods.

Once the directions of the sound sources 401 and the loudness levels of the different sound sources 401 have been determined the beamformer parameters can be determined. The beamformer parameters can provide an indication of the directional amplification and/or attenuation that is to be applied. For example, a single beamformer pattern 409 can be selected for use or a combination of beamformer patterns 409 can be selected for use. Where a combination of beamformer patterns 409 are selected for use the weightings for the different beamformer patterns 409 can be determined.

In some examples one or more of the beamformer patterns 409 can have a weighting set to zero so that this beamformer pattern 409 is not used. This could be the case if an unwanted sound source 401 is in the look direction 411 of that particular beam former pattern 409. The examples of FIGS. 4 to 9 show different example combinations of beamformer patterns 409 that can be selected based on the combinations of the directions and loudness levels of the sound sources 401.

Once the beamformer parameters have been determined a beamformer parameter signal 1005 is provided from the sound source direction and level analysis module 1003 to a beamformer module 1007. This provides an indication to the beamformer module 1007 as to which beamformer patterns 409 are to be used and the weightings to be applied in any combinations.

The beamformer module 107 applies the beamformer patterns 409 to the audio signals 1001 to provide an audio output signal 1009. The audio output signal 1009 can comprise a mono signal, a spatial audio signal or any other suitable type of signal. As the examples of the disclosure have been used to amplify target sound sources 401A and attenuate unwanted sound source 401B the audio output signal 1009 can provide high quality audio output.

FIG. 11 schematically shows modules of another apparatus 103 that could be used to implement examples of the disclosure. In the example of FIG. 11 the apparatus 103 is configured to control the overall level of sound so that target sound sources 401 that are in the region of interest 403 are approximately at the same level regardless of where the loudest sound source 401 is located. This can be achieved by applying an overall gain to the audio signals. In the example of FIG. 11 this is achieved by applying a gain to the audio signals after the beamforming has been applied. In other examples the gain can be applied to the audio signals before the beamforming is applied.

In the example of FIG. 11 the two or more microphones 105 are configured to obtain a plurality of audio signals 1001 and provide these to the modules of the apparatus 103. The plurality of audio signals 1001 are provided to a sound source direction and level analysis module 1003 and also a beamformer modules 1007 that can be as shown in FIG. 10.

In the example of FIG. 11 the beamformer module 1007 also calculates a gain modifier from the beamformer patterns 409 that are to be applied to the beamformed audio signals.

Any suitable process can be used to calculate the gain modifier. In some examples the gain modifier can be calculated using a measurement of the beamformer patterns 409 that are to be used. The apparatus 103 can then find the difference of the amplification of the beamformer pattern 409 in the look direction and the attenuation of the beamformer pattern 409 in the null direction. The gain can then be calculated so that the audio signal is amplified by this difference.

In some examples using simply the difference in the amplification and attenuation levels could result in level changes that are too abrupt. In such cases a smaller value of the difference could be used, for example, half of the difference.

In examples of the disclosure a measurement of the beamformer patterns 409 could be used. The measurement can be better than a theoretical calculation of the beamformer patterns 409 because the theoretical calculations ignore sources of error such as internal noise from the microphones 105, assembly tolerances and other factors. The theoretical calculation therefore can give an overly optimistic indication of the beamformer performance compared to the measurements.

Once the gain to be applied has been calculated the beamformer module 1007 provides a gain modifier signal 1101 to the gain module 1103. The gain module 1103 then uses the information in the gain modifier signal to apply an overall gain to the audio signals to provide a gain adjusted audio output signal 1105.

FIG. 12 shows a method that can be used in some examples of the disclosure. The method can be implemented using apparatus 103 and electronic devices 101 as described above or by using any other suitable type of apparatus 103 or electronic devices 101.

At block 1201 the method comprises analysing a plurality of audio signals. The audio signals can be any signals that are detected by the plurality of microphones 105. Some preprocessing can be performed on the microphone signals before they are analysed.

The plurality of audio signals can be analysed to find the directions of one or more sound sources 401 relative to the electronic device 101. The audio signals can be analysed to determined loudness levels of the one or more sound sources 401, frequency characteristics of the one or more sound sources 401 and any other suitable parameters.

At block 1203 the sound sources 401 within the region of interest 403 are identified. In some examples the sound sources 401 can be categorized as either being within the region of interest 403 or being outside of the region of interest 403. The information indicative of the directions of the one or more sound sources 401 that is obtained at block 1201 can be used to determine whether or not the sound sources 401 are within the region of interest 403.

Sound sources 401 that are within the region of interest 403 can be categorized as target sound sources 401 and sound sources 401 that are outside of the region of interest 403 can be categorized as unwanted sound sources 401. Other means for identifying a sound source 401 as a target sound source or an unwanted sound source 401 could be used in some examples of the disclosure.

At block 1205 the loudest sound sources 401 can be found. In some the examples the loudest sound source 401 within the region of interest 401 can be found and the loudest sound source 401 that is not within the region of interest 401 can also be found. This can enable the loudest target sound source 401 to be compared to the loudest unwanted sound source 401.

At block 1207 it can be determined whether or not the loudest sound source 401 is within the region of interest 403. It can be determined whether or not the loudest target sound source 401 is louder than the loudest unwanted sound source 401.

If the loudest sound source 401 is an unwanted sound source 401 that is outside of the region of interest 401 then, at block 1209, the method comprises applying beamformers to attenuate the loudest sound source 401. In other examples other means such as spectral filtering could be used to provide the directional amplification and attenuation. The beamformer that is applied at block 1209 can be selected to attenuate the unwanted sound sources 401 and to amplify the target sound sources 401 that are within the region of interest 403.

The beamformers that are applied at block 1209 can also be selected to avoid modification to the timbre or other frequency characteristics of the sound sources 401. The beamformers can be selected so as to avoid modification to the timbre or other frequency characteristics of both the target sound sources 401 and unwanted sound sources.

If the loudest sound source 401 is a target sound source 401 that is within the region of interest 401 then, at block 1211, the method comprises not applying beamformers to attenuate the loudest sound source 401. In these examples the loudest source is already a target sound source 1211 and so should be easily detected compared to the other sound sources 401. In these examples amplification can be applied to the target sound source 401 or other gains can be applied.

FIG. 13 shows another method that can be used in some examples of the disclosure. The method can be implemented using apparatus 103 and electronic devices 101 as described above or by using any other suitable type of apparatus 103 or electronic devices 101.

At block 1301 the apparatus 103 can detect the loudness and direction of the sound sources 401. The apparatus 103 can use the audio signals obtained from the plurality of microphones 105 to detect the loudness and directions of the sound sources 401. The apparatus 103 can identify which of the sound sources 401 are located within the region of interest 403 and which of the sound sources 401 are located outside of the region of interest 403. This enables the apparatus 103 to identify the target sound sources 401 and the unwanted sound sources 401.

At block 1303 the method comprises selecting a first beamformer pattern 409A that has look direction 411A directed towards the target sound source 401. The look direction 411A of the first beamformer pattern 409A can be within the region of interest 401. At block 1305 the method comprises selecting a second beamformer pattern 409B that has null direction 413B directed towards the unwanted sound source 401. It is to be appreciated that blocks 1303 and 1305 can be performed in any order or could be performed simultaneously.

After the second beamformer pattern 409B has been selected then at block 1307 the apparatus 103 check the loudness of any sound sources 401 within the look direction 411B of the second beamformer pattern 409B. If there is a sound source with a loudness above a threshold in the look direction 411B of the second beamformer pattern 409B or substantially in the look direction 411B of the second beamformer pattern 409B then this can be factored into the weighting applied to the second beamformer pattern 409B.

At block 1309 the weighting that is to be used for the two different beamformers patterns 409A, 409B is calculated. Any suitable methods can be used to calculate the weights for the two beamformers.

In some examples the beamformer weights can be calculated as follows:

$|OB1|$ is the energy of a target sound source 401 within the look direction 411A of the first beamformer pattern 409A. $|OB2|$ is the energy of an unwanted sound source 401 within the null direction 413B of the second beamformer pattern 409B. $|OB3|$ is the energy of an unwanted sound source 401 within a look direction 411B of the second beamformer pattern 409B $$\hat{a} = \min\left(\max\left(\frac{20\log_{10}\frac{|OB1|}{|OB2|} + 6}{12}, 0\right), 1\right)$$

$$\hat{b} = \min\left(\max\left(\frac{20\log_{10}\frac{|OB2|}{|OB3|} + 6}{12}, 0\right), 1\right)$$

$$b = (1 - \hat{a})\hat{b}$$

$$a = 1 - b,$$

where a is the weight for Beamformer 1 and b is the weight for beamformer 2.

Once the weights have been calculated then at block 1311 a weighted combination of beamformers is calculated and at block 1313 the beamformer combinations are used on the audio signals.

In the example of FIG. 13 the combination is formed from two beamformer patterns 409. Is to be appreciated that more than two beamformer patterns 409 could be used in some examples of the disclosure. In such examples each of the beamformer patterns 409 with a null direction 413 towards the unwanted sound sources can be checked to see if the corresponding look direction is directed towards another unwanted sound source.

FIGS. 14A and 14B show another example electronic device 101 that could be used in some examples of the disclosure. The electronic device 101 could be a mobile phone or any other suitable type of electronic device 101. In this example the electronic device 101 does not comprise a sufficient number of microphones 105 to enable unambiguous beamforming in a desired direction. In this example the electronic device 101 comprises two microphones 105. The microphones 105 could be omnidirectional microphones 105 that record sounds equally, or substantially equally, from all directions. It is to be appreciated that effects such as acoustic shadowing caused by the electronic device 101 and deviations due to integration of the microphones 105 into the electronic device 105 can prevent the recordings from being precisely equal.

FIG. 14A shows the electronic device 101 in landscape orientation and FIG. 14B shows the electronic device 101 in portrait orientation. When the electronic device 101 is in landscape orientation a first microphone 105 is provided at the right-hand side of the electronic device 101 and a second microphone 105 is provided at the left-hand side of the electronic device 101.

When the electronic device 101 is in the landscape orientation the microphones 105 at left and right sides of the electronic device 101 record sounds equally from the front and back of the electronic device 101. Also sounds from the front and back of the electronic device 101 arrive at the same time to the two different microphones 105. This means that there is no way to use the audio signals from the microphones 105 to distinguish between a sound source 401 positioned in front of the electronic device 101 and a sound source 401 positioned behind the electronic device 101.

The electronic device 101 can beamform to the left or the right but not to the front or back due to the limitations of the microphones 105. Instead, the microphones 105 will amplify or attenuate sound sources 401 from the front and back equally, or substantially equally. This means that if the electronic device 101 is configured to amplify a sound source 401 positioned in front of the electronic device 101 it will also amplify any sound sources 401 that are positioned behind the electronic device 101.

A similar problem can occur in an electronic device 101 comprising three microphones 105 if the electronic device 101 tries to amplify sounds from above or below the plane in which the microphones 105 are located. This could occur, for example, in a mobile phone or other similar device, when it is oriented in portrait orientation and tries to amplify and/or attenuate sounds sources from the left or right of the electronic device 101.

FIG. 15 shows an example of beamformer patterns 409 that can be used for the electronic devices 101 shown in FIGS. 14A and 14B. In this example the electronic device 101 is being used to capture images and so the field of view 1501 of a camera 107 is shown.

In the example of FIG. 15 the electronic device 101 comprise two microphones 105 that are positioned at opposite sides of the electronic device 105. This enables three different beamformer patterns 409 to be formed. The beamformer patterns 409 comprise a left beamformer pattern 409D, a right beamformer pattern 409E and a front/back beamformer pattern 409F. The front/back beamformer pattern 409F would amplify and attenuate sound sources 401 in front of the electronic device 101 substantially equally to sound sources 401 behind the electronic device 101. The left beamformer pattern 409D would mainly amplify sound sources 401 that are located to the left of the electronic device 101 and the right beamformer pattern 409E would mainly amplify sound sources 401 that are to the right of the electronic device.

In such examples if a sound source 401 is determined to be in a region that comprises the front/back beamformer pattern 409F then it cannot be determined if this sound source is in front of the electronic device 101 or behind of the electronic device 101. In the example of FIG. 15 it cannot be determined conclusively if the sound source 401 is within the field of view 1507 of the camera 107 or not. In such cases it cannot be determined if a sound source 401 is a target sound source 401 or an unwanted sound source 401.

Therefore, in such cases if a sound source 401 is determined to be in a region that comprises the front/back beamformer pattern 409F the apparatus 103 can be configured so that the front/back beamformer pattern 409F is not applied. In such cases it cannot be determined whether the sound source 401 is in front of or behind of the electronic device 401 and so cannot be classified as a target sound source 401 or an unwanted sound source 401. If the sound source 401 is a target sound source in front of the electronic device 101 then the front/back beamformer pattern 409F would cause amplification of this sound source 401. However, if the sound source 401 is an unwanted sound source 401 that is behind the electronic device 101 then the front/back beamformer pattern 409F would cause amplification of the unwanted sound source 401 which could degrade the audio quality. Therefore, the apparatus 103 is configured so that the beamformer pattern is not applied if the electronic device 101 cannot distinguish between sound sources 401 in front of the electronic device 101 and sound sources 401 that are behind the electronic device 101.

If a sound source 401 is determined to be in a region that comprises the left beamformer pattern 409D then it can be determined that this sound source 401 is to the left of the electronic device 401 rather than at the right. This can enable the sound source to be identified as a target sound source 401. If the sound source 401 is identified as a target sound source 401 then the left beamformer pattern 409D can be applied as appropriate.

Similarly If a sound source 401 is determined to be in a region that comprises the right beamformer pattern 409E then it can be determined that this sound source 401 is to the right of the electronic device 401 rather than at the left. This can enable the sound source to be identified as a target sound source 401 and so if the sound source 401 is identified as a target sound source then the right beamformer pattern 409E can be applied as appropriate.

Therefore in the example of FIG. 15 the apparatus 103 within the electronic device 101 is configured so that if a sound source 401 can be identified as a target sound source a beamformer is applied and if a sound source 401 cannot be identified as a target sound source a beamformer is not applied. This avoids unintentionally amplifying unwanted sound sources 401. In such cases a sound sources 401 can be considered to be in a region of interest if it is within a region covered by the left beamformer pattern 409D or the right beamformer pattern 409E. When the sound source 401 is within the region of interest then a beamformer can be applied and the sound source 401 can be amplified. Conversely sound sources 401 can be considered to not be in a region of interest if it is within a region covered by the front/back beamformer pattern 409F. When the sound source 401 is not within a region of interest then a beamformer is not applied and there is no amplification.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although examples have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain examples, those features may also be present in other examples whether described or not.

The term 'a' or 'the' is used in this document with an inclusive not an exclusive meaning. That is any reference to X comprising a/the Y indicates that X may comprise only one Y or may comprise more than one Y unless the context clearly indicates the contrary. If it is intended to use 'a' or 'the' with an exclusive meaning then it will be made clear in the context. In some circumstances the use of 'at least one' or 'one or more' may be used to emphasis an inclusive meaning but the absence of these terms should not be taken to infer any exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

We claim:

1. An apparatus comprising:

at least one processor, and at least one memory storing instructions that, when executed with the at least one processor, cause the apparatus at least to:

obtain two or more audio signals from a plurality of microphones of an electronic device;

determine loudness of one or more sound sources based on the two or more audio signals so as to determine the loudest sound source;

determine whether the loudest sound source is within a region of interest based on the two or more audio signals; and control audibility of the one or more sound sources with a combination of beamformers in accordance with whether the loudest sound source is within a region of interest such that, if the loudest sound source is not within the region of interest the loudest sound source is de-emphasized relative to one or more other sound sources within the region of interest;

wherein at least one first beamformer of the combination of beamformers comprises a look direction that at least partially comprises the region of interest; and wherein at least one second beamformer of the combination of beamformers comprises a null direction, the null direction comprising a direction towards a sound source having a threshold loudness outside of the region of interest.

2. An apparatus as claimed in claim 1, wherein the instructions, when executed with the at least one processor, cause the apparatus to emphasize the loudest source if it is determined that the loudest sound source is within the region of interest.

3. An apparatus as claimed in claim 1, wherein the instructions, when executed with the at least one processor, cause the apparatus to attenuate the loudest sound source relative to other sounds.

4. An apparatus as claimed in claim 1, wherein the instructions, when executed with the at least one processor, cause the apparatus to apply directional amplification in the region of interest when the loudest sound source is within the region of interest.

5. An apparatus as claimed in claim 1, wherein the instructions, when executed with the at least one processor, cause the apparatus to apply directional attenuation in a direction comprising the loudest sound source when the loudest sound source is not within the region of interest.

6. An apparatus as claimed in claim 4, wherein at least one of the directional amplification or the directional attenuation is configured to reduce modification to the timbre of the loudest sound source.

7. An apparatus as claimed in claim 6, wherein the instructions, when executed with the at least one processor, cause the apparatus to at least one of:

determine a dominant range of frequencies for the loudest sound source; or select at least one of directional amplification or directional attenuation having a substantially flat response for the dominant range of frequencies.

8. An apparatus as claimed in claim 7, wherein the dominant range is determined based on the type of sound source.

9. An apparatus as claimed in claim 1, wherein the instructions, when executed with the at least one processor, cause the apparatus to at least one of:

determine a direction of another sound source having a threshold loudness; or reduce a weighting of the at least one second beamformer if the another sound source having a threshold loudness is located towards a look direction of the second beamformer.

10. An apparatus as claimed in claim 1, wherein the electronic device comprises two microphones, and if a sound source is identified as a target sound source a beamformer is applied and if a sound source is not identified as a target sound source a beamformer is not applied.

11. An apparatus as claimed in claim 1, wherein the instructions, when executed with the at least one processor, cause the apparatus to apply a gain to maintain an overall volume of the audio signal.

12. An apparatus as claimed in claim 1, wherein the region of interest is determined with an audio capture direction of the electronic device.

13. An apparatus as claimed in claim 1, wherein the region of interest comprises a field of view of a camera of the electronic device.

14. A method comprising:

obtaining two or more audio signals from a plurality of microphones of an electronic device;

determining loudness of one or more sound sources based on the two or more audio signals so as to determine the loudest sound source;

determining whether the loudest sound source is within a region of interest based on the two or more audio signals; and controlling audibility of the one or more sound sources with a combination of beamformers in accordance with whether the loudest sound source is within a region of interest such that, if the loudest sound source is not within the region of interest the loudest sound source is de-emphasized relative to one or more other sound sources within the region of interest;

wherein at least one first beamformer of the combination of beamformers comprises a look direction that at least partially comprises the region of interest; and wherein at least one second beamformer of the combination of beamformers comprises a null direction, the null direction comprising a direction towards a sound source having a threshold loudness outside of the region of interest.

15. A non-transitory program storage device readable with an apparatus tangibly embodying a program of instructions executable with the apparatus for performing operations, the operations comprising:

obtaining two or more audio signals from a plurality of microphones of an electronic device;

determining loudness of one or more sound sources based on the two or more audio signals so as to determine the loudest sound source;

determining whether the loudest sound source is within a region of interest based on the two or more audio signals; and controlling audibility of the one or more sound sources with a combination of beamformers in accordance with whether the loudest sound source is within a region of interest such that, if the loudest sound source is not within the region of interest the loudest sound source is de-emphasized relative to one or more other sound sources within the region of interest;

wherein at least one first beamformer of the combination of beamformers comprises a look direction that at least partially comprises the region of interest; and wherein at least one second beamformer of the combination of beamformers comprises a null direction, the null direction comprising a direction towards a sound source having a threshold loudness outside of the region of interest.

16. The method as claimed in claim 14, wherein controlling audibility of the one or more sound sources comprises emphasizing the loudest source if it is determined that the loudest sound source is within the region of interest.

* * * * *